United States Patent Office 3,554,730
Patented Jan. 12, 1971

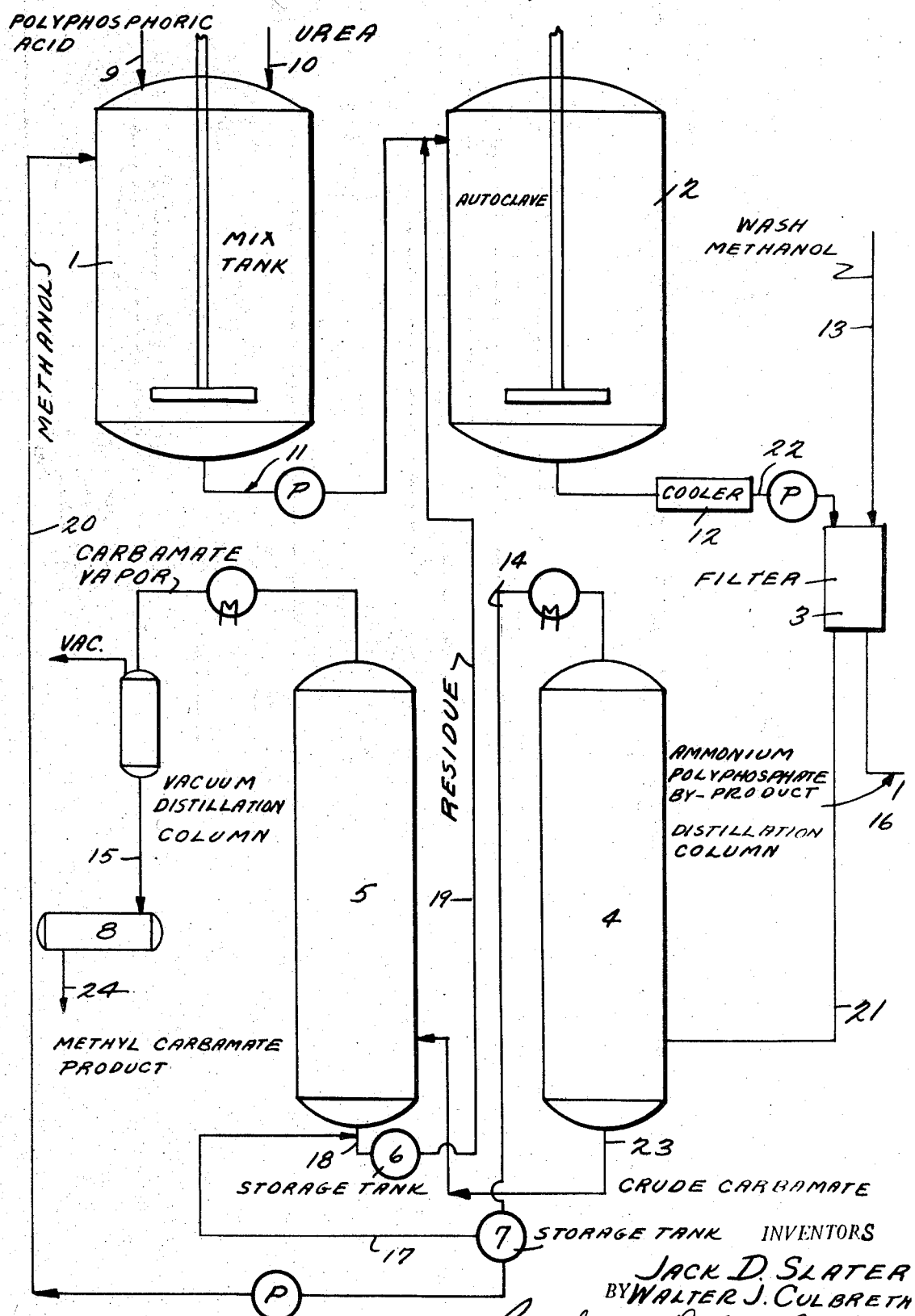

3,554,730
CARBAMIC ESTER PROCESS AND FERTILIZER
VALUES THEREIN
Jack D. Slater, Savannah, and Walter J. Culbreth, Garden City, Ga., assignors to Kaiser Aluminum & Chemical Corporation, Oakland, Calif., a corporation of Delaware
Filed Jan. 17, 1967, Ser. No. 609,837
Int. Cl. C05b 7/00
U.S. Cl. 71—34     10 Claims

ABSTRACT OF THE DISCLOSURE

An improved process for the production of carbamic esters of the general formula $NH_2COOR$, wherein R is a radical derived from a monofunctional monoalcohol of the formula ROH, which may be aliphatic, is disclosed. Urea, the alcohol of the formula ROH, and polyphosphoric acid are reacted together to produce the carbamic ester and ammonium polyphosphate as a by-product.

CARBAMIC ESTER PROCESSES OF THE PRIOR ART

It is well-known that esters of carbamic acid can be prepared by heating urea with an excess of alcohol at an elevated temperature for a prolonged period. For example, the reaction represented by the formula:

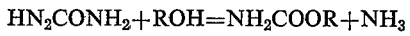

generally takes from 12 to 48 hours, with the elimination of ammonia. In the preparation of methyl carbamate from urea and methyl alcohol by the above reaction, a yield of only 45%, based on the urea, is obtained after heating at the reflux temperature for 35 hours.

The prior art has also utilized urea salts, such as urea nitrate, in place of the urea in the above reaction. The anion of the salt will combine with the liberated ammonia to form an ammonium salt, e.g., ammonium nitrate, in the following reaction:

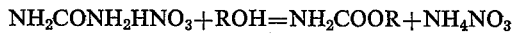

In carrying out this reaction either urea nitrate must be employed or else the urea nitrate is prepared in situ by the careful addition of nitric acid (96–98% nitric acid in stoichiometric quantity) to an agitated and cooled mixture of urea in excess alcohol. Such a mixture is cooled to minimize the formation of the inorganic acid ester of the alcohol. If an excess amount of nitric acid is present, resin formation and low yields by secondary oxidation reactions are encountered. The urea nitrate is classified as a dangerous and hazardous material due to its explosive nature, whereas the 96–98% nitric acid is a powerful oxidizing agent which must be handled with extreme caution and special equipment. The ammonium nitrate by-product formed by this reaction is soluble in the excess of alcohol and requires an additional process step, e.g., a solvent extraction, for the separation of the ammonium nitrate from the carbamic ester and the excess alcohol.

The same type of problems have been encountered by the prior art when using an urea sulphate salt or forming urea sulphate in situ by the use of 98–100% sulphuric acid. For the highest yields of product, both the acid and the alcohol used in the carbamic ester process should be as anhydrous as possible. Therefore, the use of urea chloride or hydrochloric acid forming an urea chloride in situ is even less feasible due to the difficulties of preparing the urea chloride and the difficulties of handling anhydrous hydrogen chloride gas. Ammonium chloride, like ammonium nitrate, is soluble in alcohol and also requires an additional process step for the separation of this by-product.

OBJECTS OF THE INVENTION

It is an object of this invention to provide a process for the production of carbamic esters in high yield. It is another object of this invention to provide a process for producing carbamic esters wherein difficulties which have plagued prior art carbamic ester processes are eliminated. It is yet a further object of this invention to provide a process for producing carbamic esters from urea, an alcohol and polyphosphoric acid. It is another object of this invention to provide a process for the production of carbamic esters, with ammonium polyphosphate produced as a useful by-product.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

SUMMARY OF THE INVENTION

The present invention is directed to an improved process for producing carbamic esters of the formula $NH_2COOR$, wherein R is a radical derived from a monofunctional monoalcohol of the formula ROH. The alcohol may be aliphatic, cycloaliphatic or araliphatic, and contains up to about 18 carbon atoms. The carbamic ester is prepared by reacting urea and polyphosphoric acid in an amount of approximately stoichiometric to about 10% excess, based on the amount of urea, and the alcohol ROH in an amount of at least 300% excess, based on the urea, at a temperature of about 130 to about 150° C. for one hour or less. After the reaction is complete, ammonium polyphosphate by-product can be removed, e.g., by cooling and filtering. The excess alcohol is removed from the product carbamic ester, e.g., by distillation. If desired, the carbamic ester may be subsequently purified. Yields in the order of 85% or higher of the carbamic ester are obtained, and when operated continuously in the production of methyl carbamate the present process allows yields of the order of 99% to be realized.

DETAILED DESCRIPTION OF THE INVENTION

Carbamic esters of the general formula $NH_2COOR$ are produced by the process of the present invention. R is a radical derived from a monofunctional monoalcohol of the formula ROH. R is a hydrocarbon radical which is free from reactive groups (i.e., the compound ROH is monofunctional) and may be aliphatic, cycloaliphatic or araliphatic. Preferably, the monofunctional monoalcohol represented by the formula ROH has a boiling point below 150° C. Suitable examples of radicals represented by R are aliphatic radicals such as methyl, ethyl, isopropyl, n-propyl, n-, s-, and t-butyl, hexyl, 2-ethylhexyl, decyl, dodecyl, octadecyl, allyl, and butenyl; cycloaliphatic radicals such as cyclohexyl, 1,3- and 1,4-cyclohexenyl, and cyclopentenyl; and araliphatic radicals such as benzyl, xylyl, and mesityl.

Preferred radicals represented by R are lower alkyl radicals containing up to 4 carbon atoms. However, any monofunctional monoalcohol of up to about 18 carbon atoms may be utilized in the present process. Preferably such an alcohol has a boiling point of about below 150° C. to facilitate the removal of excess alcohol from the carbamic ester product by distillation.

Yields of 85% or higher of the carbamic ester, based on the urea, can be obtained in a reaction time of one hour or less when urea is heated with polyphosphoric acid of from about the stoichiometric amount to about a 10% excess, based on the urea, in an excess of alcohol. The reaction time is a function of the reaction temperature, which is generally within the range of about 130 to about 150° C., and preferably is about 140° C. The reaction is conducted at superatmospheric pressures, preferably about 110 to 150 p.s.i.g. The resulting ammonium polyphosphate by-product is nearly insoluble in alcohols and can be easily separated from the alcohol/carbamic ester solution by a simple filtration step. Unlike some of the other ammonium salts, ammonium phosphate is not explosive, and is therefore much easier to handle. The polyphosphoric acid has a very low level of corrosivity and can be handled with a minimum of special precautions.

The by-product ammonium polyphosphate, when dried, is a valuable and very useful fertilizer material, containing about 12% N and about 60% $P_2O_5$. If desired, agronomic metal oxides, such as zinc oxide, can be introduced into the reaction zone, to be removed with the ammonium polyphosphate by-product, thus providing agronomic metal oxides in the ammonium polyphosphate fertilizer as additional plant food material. From 0.002 to 10.0% by weight of at least one agronomic metal oxide may be added to the reaction mixture.

It has been previously proposed in the prior art literature that certain metal oxides, such as zinc oxide, be employed as catalysts in carbamate ester processes to increase the yield or decrease the reaction time of the reaction of urea with an alcohol. In the process of the present invention the presence of zinc oxide or other metal oxides may decrease the reaction time as much as 50%, but no increases of yields were observed and, in fact, an adverse effect on yields was noticed for some systems. In view of this possibly adverse yield effect, the use of zinc oxide or other metal oxide will generally be for systems where the presence of such metal oxides in the ammonium polyphosphate product for nutrient purposes is desired. Other trace elements, such as boron, copper, iron, manganese, molybdenum, cobalt and nickel oxides or other compound forms could also be added in lieu of, or in addition to, the zinc oxide or other zinc compound. These other metal oxides or the like would be utilized, not for catalytic purposes, but to add desired metal elements to the ammonium polyphosphate by-product.

When the term "polyphosphoric acid" is used in the present application, it is to be construed to be those polyphosphoric acids described in Kirk Othmer, Encyclopedia of Chemical Technology, volume 10, pages 411 and 412, 1953, the Interscience Encyclopedia Inc., New York. In addition, the term "polyphosphoric" is meant to include "superphosphoric" acid, i.e., phospholeum, an azeotropic mixture of orthophosphoric acid and polyphosphoric acids which, upon dilution with water forms orthophosphoric acid. Phospholeum generally contains about 76% $P_2O_5$ and 105% $H_3PO_4$. The superphosphoric acid may be derived from either "furnace grade" phosphoric acid or "wet process grade" phosphoric acid and should contain about 95 to about 105% equivalent $H_3PO_4$, preferably about 98 to about 100% equivalent $H_3PO_4$. The use of superphosphoric acid derived from wet process grade phosphoric acid is a significant advantage as an appreciable cost saving is realized.

It will be seen that the present invention is directed to an improved process for producing carbamic esters from urea and an alcohol in which liberated ammonia reacts with polyphosphoric acid (including superphosphoric acid) to form ammonium polyphosphate of good commercial value. The carbamic esters are produced in yields of the order of 85% or more during a reaction time of about one-half to about one hour. The process is relatively free of operational hazards and the yields of the carbamic ester are relatively independent of the use of an excess of the acid.

The polyphosphoric acid will be preferably used in amounts of approximately stoichiometric to about 10% excess, based on the amount of urea. Less than stoichiometric amounts of polyphosphoric acid can be utilized but the yield will be adversely effected. If greater than 10% excess of polyphosphoric acid is used, the resultant by-product fertilizer material will contain a less desirable N:P ratio, although such excess amounts of polyphosphoric acid can be used.

The alcohol of the formula ROH should be used in no less than 300% excess based on the amount of urea. There is no top limit on the excess of the alcohol except the practical consideration that this excess must be subsequently separated, e.g., by distillation, from the carbamic ester. Therefore, for practical considerations the alcohol will generally not be used in an amount greater than 5000% excess, based on the amount of urea. Preferably, from 6 to 50 mols of alcohol, per mol of urea, are used.

The present process may be operated as a batch or as a continuous process, although a continuous basis is preferable as the yield obtained in a continuous process will generally be much higher, e.g., up to about 99% yield as compared to about 85–90% yield on batch operations.

An additional significant advantage of the present process is in the case of separation of the ammonium polyphosphate by-product. Simple filtration will provide an effective separation of the ammonium polyphosphate, and any trace agronomic metal oxides, from the carbamic ester product in alcohol solution. After the reaction mixture is maintained at about 130° to 150° C. from about one-half to one hour at a pressure of about 110 to 150 p.s.i.g., thereby producing carbamic ester product and ammonium polyphosphate by-product, the mixture is cooled, preferably to a temperature within the range of about 25 to about 35° C., and the ammonium polyphosphate is removed by filtration. The filtrate is heated and the excess alcohol is removed by distillation and thereafter condensed. The distillation may be at sub-atmospheric or super-atmospheric pressures, but is preferably at atmospheric pressure. The crude carbamic residue may then be vacuum distilled (e.g., distilled at pressures of 10 to 50 mm. Hg) and the vapors condensed as purified carbamate ester. The residue from the vacuum distillation may be dissolved in alcohol and returned as recycle to the original feed solution—i.e., recycled to the reaction vessel.

DESCRIPTION OF THE DRAWING

The invention will be more readily understood with reference to the accompanying drawing, which illustrates a process flow sheet.

In the diagram, urea is introduced via conduit 10, polyphosphoric acid is introduced via conduit 9, and methanol is introduced via conduit 20 into mix tank 1. Mix tank 1 is equipped with an agitator and cooling means. After thorough mixing, the solution is pumped through conduit 11 into reaction vessel 2, which is equipped with agitating means and heating means. The reaction vessel 2 is designed for operation at super-atmospheric pressures. After the reaction is complete, the reaction mixture is passed through cooler 12 located in conduit 22 to filter 3. The ammonium polyphosphate is filtered from the cooled solution and is washed with methanol introduced via conduit 13. The methanol introduced via conduit 13 is of an amount sufficient to function as a make-up stream, replacing the methanol consumed in the reaction. The filter cake is discharged via conduit 16 as by-product ammonium polyphosphate. The filtrate from filter 3 is passed via conduit 21 to distillation column 4. Methanol is distilled from distillation column 4, condensed and passed via conduit 14 to hold tank 7. The crude carbamate is passed via conduit 23 to vacuum distillation column 5 where the purified carbamate is distilled and leaves the top of column 5 as a purified vapor at low pressure, e.g., about 10 to about 50 mm. Hg. The purified vapor is passed via conduit 15 to a crystallizer 8 and pure carbamate ester is discharged from the crystallizer 8 via conduit 24. Residual carbamate ester and other reaction products are discharged from the bottom of vacuum distillation column 5 via conduit 18 to tank 6. Alcohol is pumped from tank 7 to tank 6 via conduits 17 and 18 to dissolve the residue from distillation column 5, and the resulting solution is passed via conduit 19 to reaction vessel 2 as recycle. The methanol in tank 7 is introduced via conduit 20 to mix tank 1.

EXAMPLES OF THE INVENTION

The invention will be more clearly understood from the following examples, but it is to be understood to be in no way limited by the scope of the examples.

Example I

Methyl carbamate was prepared utilizing the apparatus illustrated on the accompanying drawing. Urea (60 parts) was introduced via conduit 10, and methanol (300 parts) was introduced via conduit 20 into mix tank 1. Polyphosphoric acid (98 parts, 100% equivalent $H_3PO_4$) was added via conduit 9 to the mix tank 1 with stirring and cooling, maintaining the solution temperature at about 40° C. After adequate mixing, the solution was pumped to autoclave 2 and heated at 138°–140° C. at about 130 p.s.i.g. for forty minutes. The reaction mixture was passed through cooler 12, cooled to about 30° C., and then filtered in filter 3. Ammonium polyphosphate (110 parts) was collected on filter 3 (a drum filter), washed with methanol (32 parts), and passed through conduit 16 for processing as a 12-60-0 grade fertilizer material.

The filtrate from filter 3 was passed via conduit 21 to distillation column 4, where methanol (350 parts) was distilled, condensed and passed via conduit 14 to tank 7. Crude carbamate was fed to vacuum distillation column 5 via conduit 23. The purified carbamate ester left the top of distillation cooler 5 as a purified vapor at a pressure of about 30 mm. Hg and was passed via conduit 15 to a crystallizer 8 wherein pure carbamate ester (68 parts) was recovered. Residual carbamate ester and a small amount of other reaction products (16 parts) from the bottom of vacuum distillation column 5 were passed via conduit 18 to tank 6. Methanol (60 parts) was pumped from tank 7 via conduits 17 and 18 to dissolve the residue in tank 6, and the resulting solution was introduced into reaction vessel 2 via conduit 19.

Based on the urea, the yield of methyl carbamate was 98% or greater.

Example II

Urea (360 grams) was dissolved in methanol (1700 grams) with slight heating to facilitate the solution. Polyphosphoric acid (588 grams, 100% equivalent $H_3PO_4$, derived from furnace grade acid) was then added to the urea/methanol solution. The resultant solution was introduced into an autoclave and rapidly heated to a temperature of 138°–140° C. This temperature was maintained for 40 minutes, and then the reaction mixture was cooled to room temperature and filtered to remove the ammonium polyphosphate by-product. After washing with a small amount of alcohol and drying, ammonium polyphosphate (685 grams), with an analysis of 12.0% N and 60.6% $P_2O_5$, was recovered. The alcohol was removed from the filtrate by distillation at atmospheric pressure and thereafter the distillation residue was further distilled under reduced pressure. The reduced pressure distillate vapors were condensed to produce essentially pure methyl carbamate (397 grams) of a melting point of 53° C. Based on the urea, the yield of methyl carbamate was 88.2%.

Example III

Example II was repeated using polyphosphoric acid (588 grams, 100% equivalent $H_3PO_4$) derived from a Florida wet-process phosphoric acid which contained 2.2% $Fe_2O_3$ and 1.7% $Al_2O_3$. Ammonium polyphosphate (674 grams) of an analysis of 11.7% N and 60.3% $P_2O_5$ was recovered. Methyl carbamate (391 grams) of a melting point of 53° C. was recovered in a yield of 87.0%, based on urea.

Example IV

The process of Example III was repeated except that zinc oxide (2.7 grams) was added to the solution introduced into the autoclave, and the reaction time was decreased to thirty-three minutes. Similar products and byproducts were obtained except that the ammonium polyphosphate by-product contained 0.4% zinc oxide.

Obviously many modifications and variations of the present invention are possible in the light of the above teachings. It is therefore to be understood that within the scope of the appended claims the invention may be practiced otherwise than as specifically described.

What is claimed is:

1. A process for producing a carbamic acid ester of the formula $NH_2COOR$ from an alcohol and urea and wherein liberated ammonia is reacted with a polyphosphoric acid to form ammonium polyphosphate, which comprises:

(a) reacting urea, a monofunctional monoalcohol of the formula ROH and polyphosphoric acid, wherein R is an aliphatic hydrocarbon having up to about 18 carbon atoms, at a temperature and for a time sufficient to convert at least about 85% by weight of the urea to carbamic acid ester, and wherein the amount of ROH added to the reaction is at least 300% of the stoichiometrically required amount based on the weight of urea, and wherein the polyphosphoric acid amount utilized is at least equal about to the stoichiometrically required amount based on the urea, (b) separating the formed ammonium polyphosphate; and (c) recovering the carbamic acid ester product.

2. The process of claim 1, wherein the monoalcohol is free of additional reactive groups.

3. The process of claim 1, wherein the monoalcohol has a boiling point below 150° C.

4. The process of claim 2, wherein the polyphosphoric acid is utilized in an amount at least about stoichiometric to about 10% excess based on the urea, and the reaction is accomplished at a temperature of about 130° C. to about 150° C. at superatmospheric pressure.

5. The process of claim 4, wherein the superatmospheric pressure is 110 to 150 p.s.i.g. and the reaction time is less than one hour.

6. The process of claim 5, wherein the reaction time is between about one-half hour and one hour.

7. The process of claim 4, wherein the amount of monoalcohol utilized is from six to fifty mols per mol of urea and wherein the ammonium polyphosphate is separated in solid form by filtration from the carbamic acid ester and excess monoalcohol, and wherein the carbamic acid ester is recovered from the excess monoalcohol by distillation and the excess monoalcohol is recycled to the carbamic acid ester reaction.

8. The process of claim 7, wherein the carbamic acid ester recovered from the excess monoalcohol is purified by vacuum distillation and the vacuum distillation residue is dissolved in the excess monoalcohol and recycled to the carbamic acid ester reaction.

9. The process as claimed in claim 4 wherein from 0.002 to 10.0% by weight, based on the weight of urea, of at least one agronomic metal oxide is present in the reaction mixture.

10. The process as claimed in claim 9 wherein at least one agronomic metal oxide is zinc oxide, whereby the zinc oxide, and any other agronomic metal oxide present, is recovered with the solid ammonium polyphosphate by-product as an additional plant food nutrient.

References Cited

UNITED STATES PATENTS 3,218,149  11/1965  Sproull et al. _____ 71—29X

FOREIGN PATENTS 147,973  4/1960  U.S.S.R. _____ 260—482C

S. LEON BASHORE, Primary Examiner

A. L. CORBIN, Assistant Examiner

U.S. Cl. X.R.

71—29, 30; 260—482C, 926